(12) United States Patent
Faye

(10) Patent No.: US 6,510,375 B2
(45) Date of Patent: Jan. 21, 2003

(54) METHOD AND ARRANGEMENT FOR CONTROLLING A VEHICLE AND/OR FOR PROVIDING DRIVER INFORMATION WHEN THERE IS LOSS OF TIRE PRESSURE

(75) Inventor: Ian Faye, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/910,893

(22) Filed: Jul. 24, 2001

(65) Prior Publication Data

US 2002/0032513 A1 Mar. 14, 2002

(30) Foreign Application Priority Data

Jul. 27, 2000 (DE) .......................................... 100 36 580

(51) Int. Cl.$^7$ ............................................. B60K 31/00
(52) U.S. Cl. ............................. 701/93; 701/36; 701/70; 180/170; 180/412; 345/764; 345/970; 702/138; 340/432; 340/433; 340/444; 152/158
(58) Field of Search ............................... 701/36, 70, 93; 180/170, 412; 345/764, 970; 702/138; 340/444, 432, 433; 152/158

(56) References Cited

U.S. PATENT DOCUMENTS

| | | | | |
|---|---|---|---|---|
| 3,806,905 A | * | 4/1974 | Strenglein | 307/112 |
| 4,159,465 A | * | 6/1979 | Hatcher | 200/61.25 |
| 4,224,597 A | * | 9/1980 | DiCecio | 340/444 |
| 5,583,483 A | * | 12/1996 | Baumann | 340/432 |
| 5,712,616 A | | 1/1998 | Schmitt et al. | 340/442 |
| 5,826,210 A | * | 10/1998 | Izumi et al. | 340/444 |
| 6,043,737 A | * | 3/2000 | Shehan et al. | 340/440 |
| 6,118,369 A | * | 9/2000 | Boesch | 340/442 |
| 6,182,021 B1 | * | 1/2001 | Izumi et al. | 340/444 |
| 2002/0008718 A1 | * | 1/2002 | Obradovich | 345/764 |

FOREIGN PATENT DOCUMENTS

DE 33 08 080 9/1984

* cited by examiner

Primary Examiner—William A. Cuchlinski, Jr.
Assistant Examiner—Ronnie Mancho
(74) Attorney, Agent, or Firm—Walter Ottesen

(57) ABSTRACT

The invention is directed to a method and an arrangement for controlling a vehicle and for providing data to the driver as to a tire pressure loss. When a tire pressure loss is detected, a limit speed is pregiven to which the speed of the vehicle is limited. The limit speed is dependent upon the distance already traveled since occurrence of the pressure loss or the elapsed operating time. Furthermore, for a detected tire pressure loss, the maximum range or the maximum operating time of the vehicle having a tire with reduced air pressure is determined and this is displayed to the driver.

18 Claims, 2 Drawing Sheets

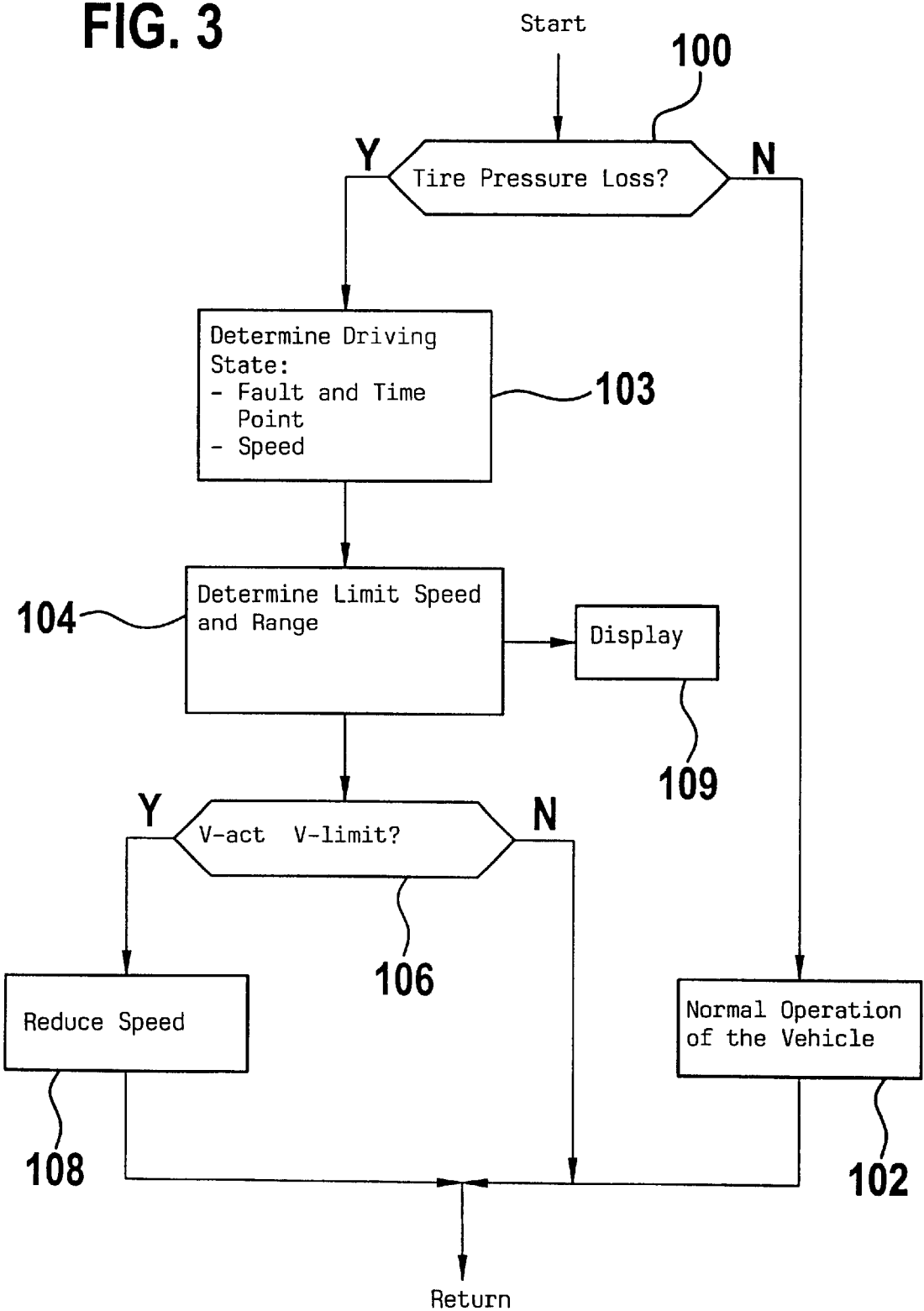

METHOD AND ARRANGEMENT FOR CONTROLLING A VEHICLE AND/OR FOR PROVIDING DRIVER INFORMATION WHEN THERE IS LOSS OF TIRE PRESSURE

BACKGROUND OF THE INVENTION

German patent publication 33 08 080 discloses a procedure wherein a relationship is pregiven between the tire pressure, which is present in a vehicle tire, and the vehicle road speed. For the particular value of the tire pressure, a reliable value for the vehicle road speed is selected from the pregiven relationship. If the permissible road speed is exceeded, then the driver is informed by an optical and/or acoustical signal and/or, in one embodiment, an intervention is undertaken via a road speed control electronic system. This intervention reduces the vehicle speed to the permissible value.

In the known solution, it is not considered that a tire having a lower pressure can have a reduced service life compared to a tire with the prescribed air pressure. This applies also for so-called "run flats", that is, those flats which can, inter alia, be driven without air pressure.

In the state of the art, there are many solutions for detecting a loss of tire pressure. It is known to measure the tire pressure directly. Furthermore, solutions are known wherein a direct measurement of the tire pressure is not made and a tire pressure loss is determined, for example, on the basis of wheel speed signals. In this connection, reference can be made to U.S. Pat. No. 5,712,616, incorporated herein by reference.

The known solutions do not consider that a tire having a lower pressure has a reduced service life compared to a tire with prescribed air pressure.

SUMMARY OF THE INVENTION

It is an object of the invention to provide a method for controlling a motor vehicle when there is a loss of tire pressure.

The method of the invention is for controlling a vehicle when there is a loss of tire pressure. The method includes the steps of: detecting if a pressure loss has occurred in at least one tire; and, if a pressure loss in at least one tire is detected, then limiting the speed of the vehicle to a limit value dependent upon at least one of the distance traveled and the elapsed operating time since occurrence of the fault.

By determining the maximum distance range, which can still be traveled with a tire having a reduced air pressure, the reduced service life of a flat tire or a tire having a low air is pressure is considered in the control of the vehicle. The determination of the range in dependence upon the vehicle speed is advantageous.

It is especially advantageous that an automatic limiting of the distance range takes place in dependence upon the actual road speed whereby the driver of the vehicle is compelled to change the tire or to add air thereto. In this way, the general further travel of the vehicle with reduced tire pressure or with a flat is substantially limited so that an increased safety is achieved also for other traffic participants.

As an alternative or supplement to limiting the distance range or range, it is especially advantageous to indicate the maximum range or the distance still remaining, for example, via the on-board computer. In this way, the driver is enabled to optimize the speed of the vehicle at reduced tire pressure.

In an especially advantageous manner, a known function is utilized for the detection of a tire pressure loss which avoids a complex sensor system and especially a direct measurement of the tire pressure.

It is further advantageous that the road speed is limited when tire pressure loss is detected. A limiting of the range additionally takes place which is dependent upon the actual speed of the vehicle. For limiting the range, the speed of the vehicle is steadily reduced to lower values if a distance was traveled since the occurrence of the pressure loss (which distance corresponds to a limit range) until, when reaching the maximum range, the speed has reached the value 0 or a very low value which permits reaching the next service station.

In an especially advantageous manner, the driver has complete control and responsibility for the vehicle even for a tire pressure loss below the limit speed.

In the context of the foregoing and following description, the term "tire pressure loss" corresponds to any operating situation for which the air pressure in a tire drops below a minimum pressure and this is independent of the nature of the reduction or of the cause, et cetera.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
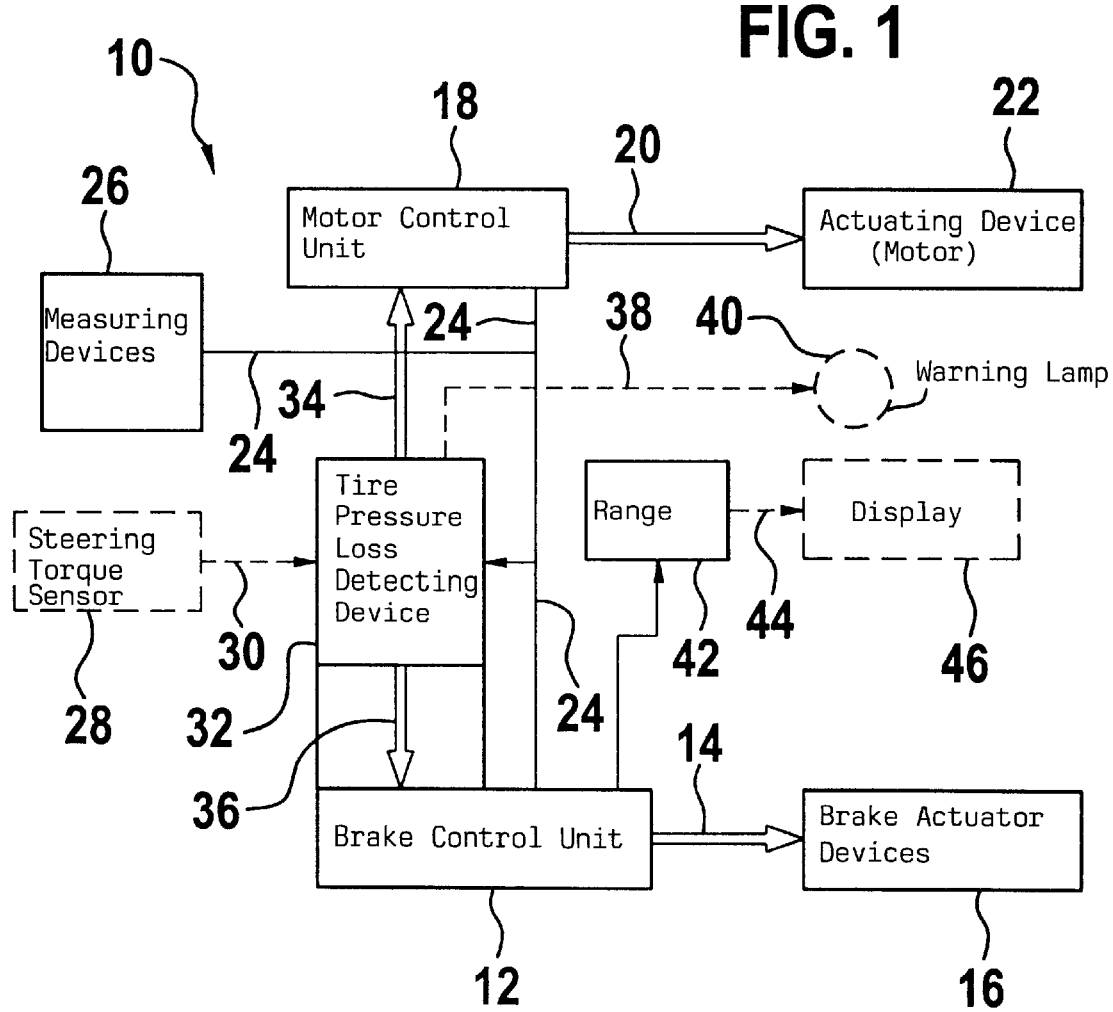
FIG. 1 is an overview block diagram for vehicle control and/or for driver information.

FIG. 1 is an overview block diagram of a control system 10 for controlling a vehicle. A brake control unit 12 actuates the brake actuator devices 16 via output lines 14. A motor control unit 18 is shown which controls the actuating devices 22 of the drive unit of the vehicle via output lines 20. Signals are supplied via the lines 24 to the motor control unit as well as the brake control unit. These signals are detected by measuring devices 26 and represent the speeds of the wheels of the vehicle. Furthermore, and as may be required, a steering torque sensor 28 is provided which supplies a signal to a tire pressure loss detection device 32 which is implemented in the brake control unit. This tire pressure loss detection device 32 (to which the wheel speeds are also supplied) is, in another embodiment, part of the motor control unit 18 or other control units (not shown) (for example, a vehicle coordinator such as with an automatic cruise control). The lines 34 and 36 are the output lines of this tire pressure loss detection device. Corresponding data as to a possibly present tire pressure loss are transmitted via lines 34 and 36 to the brake control unit 12 and the motor control unit 18. Furthermore, a warning lamp 40 of the vehicle is driven via an output line 38 present in a preferred embodiment. In addition to the tire pressure loss detection 32, a range computation 42 is provided which receives information as to the tire pressure loss and the actual speed of the vehicle and computes the maximum range therefrom in the then present operating state. The computed range is transmitted via an output line 44 to an on-board computer system 46 for display.

For example, according to a procedure known from the state of the art, it is recognized whether and, if required, which wheel is affected by a tire pressure loss, especially a flat. This recognition is made from the determined wheel speeds by making comparisons, if required, while using data as to travel in a curve which is made available, for example, by the steering torque sensor. In this case, the speed and/or the range of the vehicle is limited starting from the detection of the tire pressure loss in order to limit the use of the vehicle in the case of a loss of tire pressure.

Limiting the speed takes place by correspondingly operating on the motor control unit which has available to it a road speed which is measured or estimated from the wheel speeds. The torque of the drive unit of the vehicle is limited or reduced until the vehicle has again dropped below the pregiven highest speed. Below this highest speed, the driver has the complete control of the vehicle.

Furthermore, a computation of the maximum range with the present speed and of the path, which is traveled since detecting the tire pressure loss, is carried out, for example, likewise on the basis of the wheel speeds. From this limit range and the actual distance traveled, a further reduction of the speed is derived when the actual travel distance, which has been passed over, enters the region of the limit range.

With the tire pressure loss, the radius of the tire changes so that a detection of the tire pressure loss is made possible on the basis of the wheel speeds. In lieu of this indirect determination of the tire pressure loss, systems are known wherein the air pressure in the tire is measured directly by means of measuring devices. In such a system too, the procedure described hereinafter is applied.

When a tire pressure loss is detected, measures are initiated to bring the detected speed of the vehicle below the speed permitted for the vehicle at reduced tire pressure. This takes place by reducing the engine torque and/or by braking. The limit speed is fixedly pregiven or is estimated in dependence upon the actual or estimated tire pressure from a pregiven relationship. Further, the maximum range starting from the detection of the tire pressure loss is computed for the actual speed. A relationship between speed and range is pregiven for constant speed. This relationship is stored in the control unit in the form of a table, characteristic field or the like. When a tire pressure loss is detected, the maximum range is determined based on this pregiven relationship for the actually measured speed. From the measured distance, which has been traveled since detecting the tire pressure loss, the remaining range is computed. Preferably, the actual speed value is considered in the determination of the distance traveled since the occurrence of the tire pressure loss. This takes place in a preferred embodiment, for example, by means of a speed-dependent factor with which the actually traveled distance is evaluated. This factor can be set by driving tests and considers the fact that a reduced maximum range is present for a higher speed. When the vehicle approaches the maximum range, the highest speed is further reduced until, when reaching the maximum range, the speed 0 is reached or a low speed which permits reaching the next service station.

The range or residual range is displayed to the driver, for example, via the on-board computer. The display on the on-board computer display takes place with the highest priority in order to indicate to the driver the problem of the tire pressure loss and the limited range of the vehicle.

Figure 2:
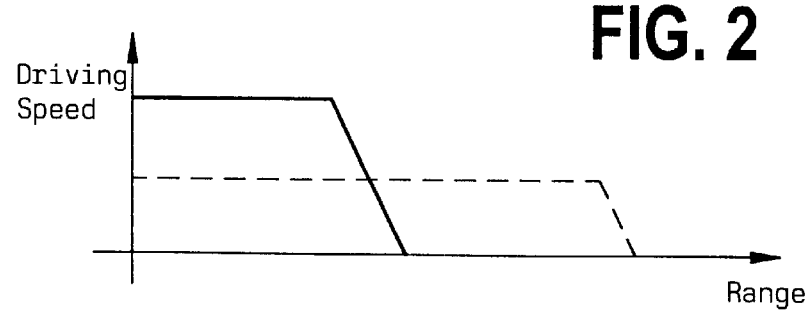
FIG. 2 is a plot of a pregiven relationship between speed and range of the vehicle; and, FIG. 3 shows a flowchart which illustrates the realization of the described procedure in a computer program.

A relationship between speed and range is shown in FIG. 2 with respect to an embodiment of the invention. Here, the ordinate shows the driving speed and the abscissa shows the range. Here, it can be seen that, at a higher speed, a shorter range is pregiven than for a lower speed. It is further shown that a ramp-shaped reduction of the speed takes place when approaching the maximum range computed for the actual speed until the speed is 0 when reaching the maximum range. In FIG. 2, a linear relationship between the speed and the range is illustrated. In another embodiment, a nonlinear relationship is pregiven. The relationships are determined in advance for each type of tire and stored. The nonlinear relationships (such as the linear relationships) are stored in the form of a table. In the case of a tire pressure loss, the range for the actually measured speed is read out. Then, the residual range is computed as above. In a preferred embodiment, the relationship between range and speed is continuous. Here, the relationship is so configured that the vehicle remains drivable at a minimum speed (for example, 20 km/h). The maximum range is correspondingly determined.

In the preferred embodiment, the procedure outlined above is realized as a computer program. Depending upon the embodiment, this program is implemented in a computer of the braking control unit, the engine control unit or in a separate control unit. An example of such a computer program is set forth in FIG. 3 in the form of a flowchart.

The illustrated program is run through cyclically at pregiven time intervals during operation of the vehicle. In the first inquiry step 100, a determination is made in accordance with a known method as to whether a pressure loss has occurred in at least one tire. If this is not the case, then the normal operation of the vehicle takes place in accordance with step 102 without the above-described speed limiting and/or distance computation and/or distance limiting being undertaken.

If step 100 shows that a tire pressure loss has occurred in at least one tire, then the driving state is determined in the next step 103. This means that the actual speed of the vehicle is determined and the path is computed which has been traveled since occurrence of the fault. Thereupon, in step 104, and in accordance with the stored relationship, the limit speed V-limit is determined. Also, on the basis of the actual speed, the maximum range is computed which, according to the actual driving state, can still be driven with the tire having the reduced air pressure. This maximum range is displayed with the highest priority to the driver in the preferred embodiment in display 109. Furthermore, in one embodiment, a defective condition is assumed and a corresponding warning lamp is activated. Furthermore, in step 104, the limit speed is determined from the distance between maximum range and the traveled distance. When approaching the maximum range, the limit speed is reduced linearly or in accordance with another function continuously or stepwise. In the next step 106, a check is made as to whether the actual speed V-act is greater than the limit speed V-limit. If this is the case, then, in accordance with step 108, the speed is reduced by a corresponding control of the power control element of the vehicle and, for a negative answer in step 106, no measures are taken.

In lieu of the range, a maximum operating time and a residual operating time are computed.

It is understood that the foregoing description is that of the preferred embodiments of the invention and that various changes and modifications may be made thereto without departing from the spirit and scope of the invention as defined in the appended claims.

What is claimed is:

1. A method for controlling a vehicle while travelling at a speed when there is a loss of tire pressure, the method comprising the steps of:

detecting if a pressure loss has occurred in at least one tire because of a fault; and, if a pressure loss in at least one tire is detected, then limiting the speed of the vehicle to a limit value dependent upon at least one of a distance traveled and an elapsed operating time since occurrence of the fault.

2. The method of claim 1, comprising the further step of determining the tire pressure loss on the basis of wheel speed signals.

3. The method of claim 1, comprising the further step of reducing the limit value of said speed in dependence upon the maximum range and the distance traveled since the occurrence of the pressure loss.

4. The method of claim 1, comprising the further step of determining a maximum operating time in lieu of the distance traveled.

5. The method of claim 1, comprising the further step of determining the operating time elapsed since occurrence of the fault in lieu of the maximum range.

6. A method for controlling a vehicle while travelling at a speed when there is a loss of tire pressure, the method comprising the steps of:
   detecting if a pressure loss has occurred in at least one tire because of a fault;
   if a pressure loss in at least one tire is detected, then limiting the speed of the vehicle to a limit value dependent upon at least one of a distance traveled and an elapsed operating time since occurrence of the fault; and,
   determining the limit speed when there is a reduced air pressure in accordance with a stored relationship between the extent of the pressure loss and the speed.

7. A method for controlling a vehicle while travelling at a speed when there is a loss of tire pressure, the method comprising the steps of:
   detecting if a pressure loss has occurred in at least one tire because of a fault;
   if a pressure loss in at least one tire is detected, then limiting the speed of the vehicle to a limit value dependent upon at least one of a distance traveled and an elapsed operating time since occurrence of the fault; and,
   determining the maximum range of the vehicle having a tire with reduced air pressure in dependence upon the actual speed of the vehicle.

8. A method for controlling a vehicle while travelling at a speed when there is a loss of tire pressure, the method comprising the steps of:
   detecting if a pressure loss has occurred in at least one tire because of a fault;
   if a pressure loss in at least one tire is detected, then limiting the speed of the vehicle to a limit value dependent upon
   at least one of a distance traveled and an elapsed operating time since occurrence of the fault; and,
   determining the maximum range in dependence upon the speed so that the vehicle remains drivable at a minimum speed.

9. A method for obtaining driver information when there is a loss of tire pressure, the method comprising the steps of:
   detecting a loss of pressure in a tire;
   when a loss in said pressure is detected, computing at least one of a maximum range which can be traveled with the tire having the reduced pressure and a maximum operating time; and,
   displaying the maximum value of said range or said maximum operating time.

10. The method of claim 9, comprising the further step of determining the tire pressure loss on the basis of wheel speed signals.

11. The method of claim 9, comprising the further step of determining a limit speed when there is a reduced air pressure in accordance with a stored relationship between the extent of the pressure loss and the speed.

12. The method of claim 11, wherein said limit speed has a limit value; and, said method comprising the further step of reducing the limit value of said limit speed in dependence upon the maximum range and the distance traveled since the occurrence of the pressure loss.

13. The method of claim 9, comprising the further step of determining a maximum operating time in lieu of the distance traveled.

14. The method of claim 9, comprising the further step of determining the operating time elapsed since occurrence of the fault in lieu of the maximum range.

15. A method for obtaining driver information when there is a loss of tire pressure, the method comprising the steps of:
   detecting a loss of pressure in a tire;
   when a loss in said pressure is detected, computing at least one of a maximum range which can be traveled with the tire having the reduced pressure and a maximum operating time;
   displaying the maximum value of said range or said maximum operating time; and,
   determining the maximum range of the vehicle having a tire with reduced air pressure in dependence upon the actual speed of the vehicle.

16. A method for obtaining driver information when there is a loss of tire pressure, the method comprising the steps of:
   detecting a loss of pressure in a tire;
   when a loss in said pressure is detected, computing at least one of a maximum range which can be traveled with the tire having the reduced pressure and a maximum operating time;
   displaying the maximum value of said range or said maximum operating time; and,
   determining the maximum range in dependence upon the speed so that the vehicle remains drivable at a minimum speed.

17. An arrangement for controlling a vehicle when there is a loss of tire pressure, the arrangement comprising:
   a control unit for operating on the speed of the vehicle;
   means for determining the loss of tire pressure in at least one tire of the vehicle because of a fault;
   means for inputting a limit speed for limiting the speed of the vehicle in dependence upon said loss of tire pressure; and,
   means for making said limit speed dependent upon at least one of the following: the distance traveled since the occurrence of the fault and elapsed operating time.

18. An arrangement for driver information when there is a loss of tire pressure, the arrangement comprising:
   a control unit for determining the loss of tire pressure;
   said control unit including means for determining at least one of a maximum range and a maximum operating time when said loss of tire pressure is present in at least one tire of said vehicle; and,
   said control unit including means for transmitting said at least one of said maximum range and said maximum operating time to a display device.

* * * * *